Figure 4:
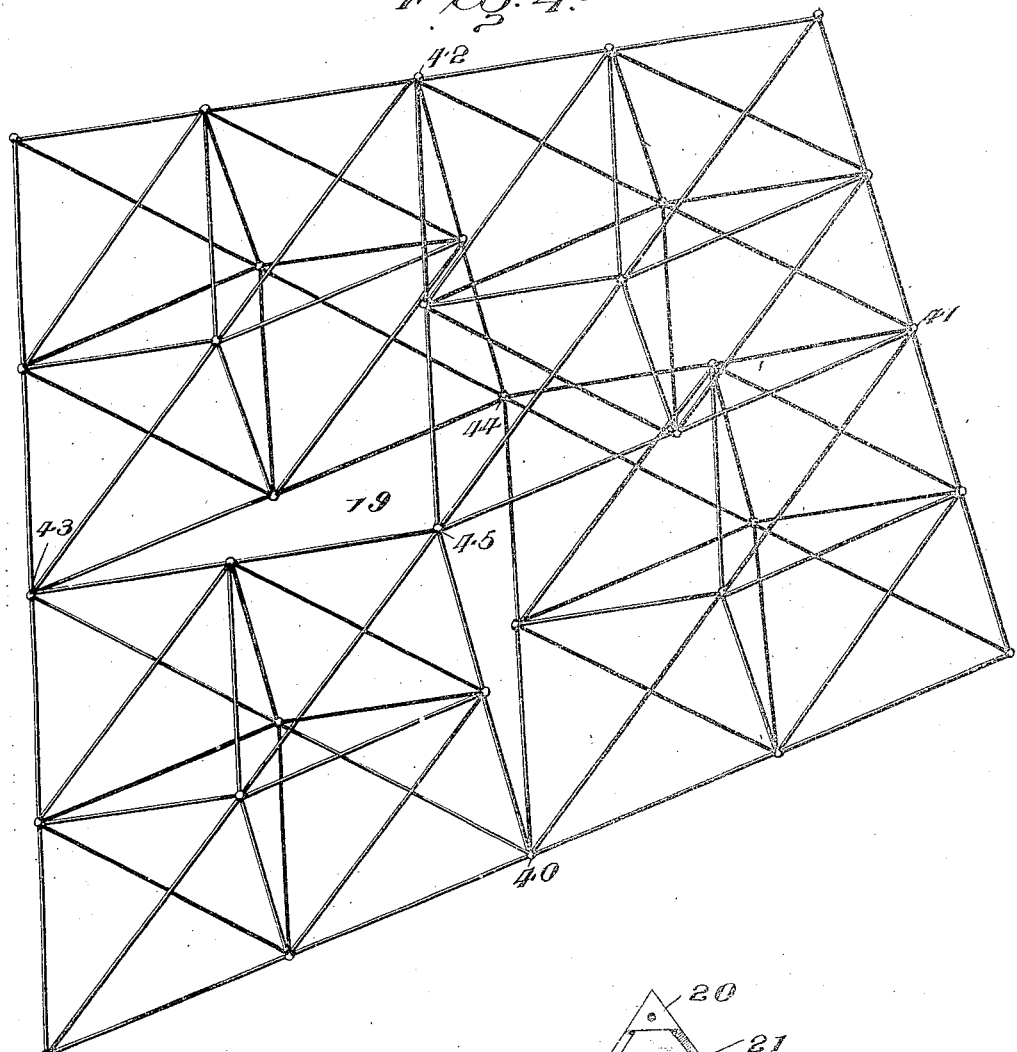

No. 770,626. PATENTED SEPT. 20, 1904.
A. G. BELL.
AERIAL VEHICLE OR OTHER STRUCTURE.
APPLICATION FILED JUNE 1, 1903.
NO MODEL. 3 SHEETS—SHEET 1.
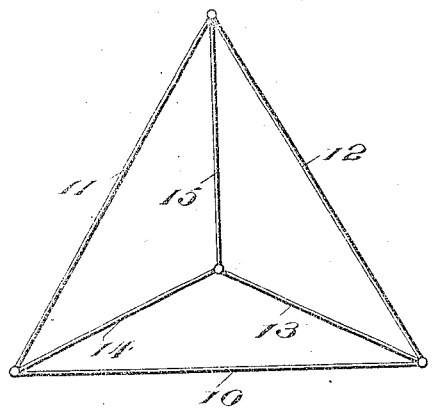
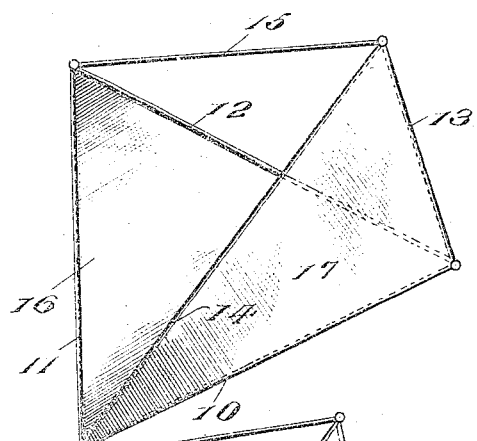
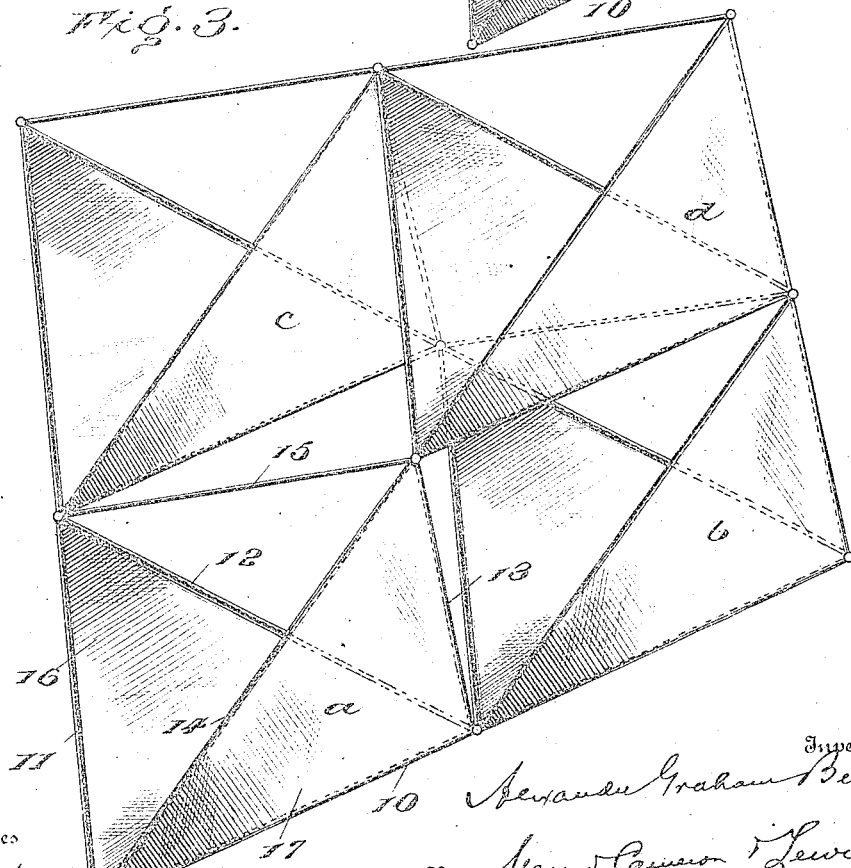

No. 770,626. PATENTED SEPT. 20, 1904.
A. G. BELL.
AERIAL VEHICLE OR OTHER STRUCTURE.
APPLICATION FILED JUNE 1, 1903.
NO MODEL. 3 SHEETS—SHEET 2.

No. 770,626. PATENTED SEPT. 20, 1904.
A. G. BELL.
AERIAL VEHICLE OR OTHER STRUCTURE.
APPLICATION FILED JUNE 1, 1903.
NO MODEL. 3 SHEETS—SHEET 3.
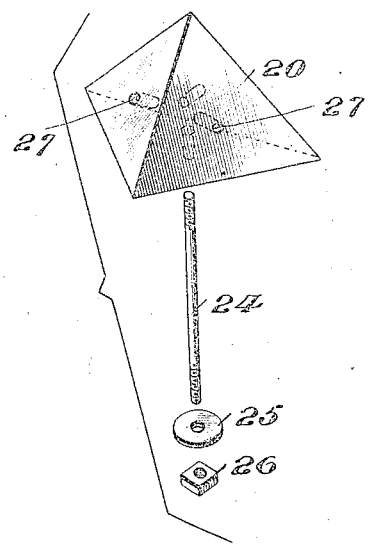
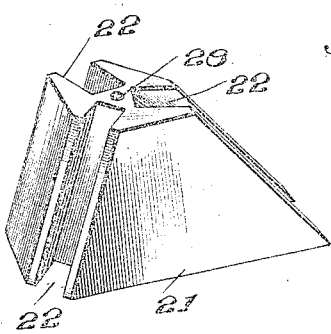
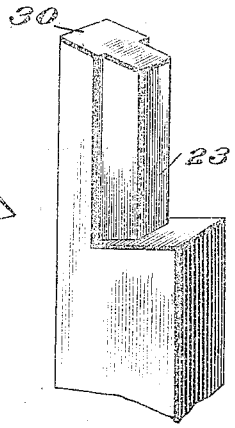
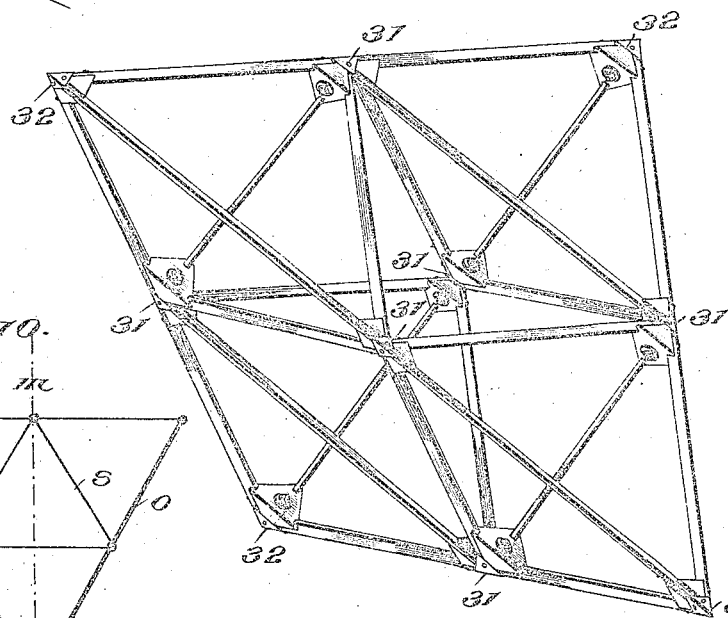
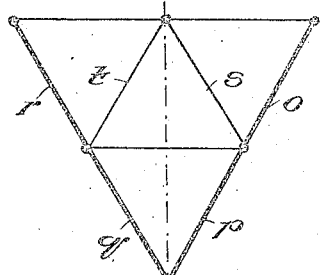

No. 770,626.

Patented September 20, 1904.

UNITED STATES PATENT OFFICE.

ALEXANDER GRAHAM BELL, OF WASHINGTON, DISTRICT OF COLUMBIA.

AERIAL VEHICLE OR OTHER STRUCTURE.

SPECIFICATION forming part of Letters Patent No. 770,626, dated September 20, 1904.

Application filed June 1, 1903. Serial No. 159,556. (No model.)

*To all whom it may concern:*

Be it known that I, ALEXANDER GRAHAM BELL, a resident of Washington, District of Columbia, have invented a new and useful Improvement in Aerial Vehicles or other Structures, which invention is fully set forth in the following specification.

The present invention is the result of investigations conducted with a view more particularly to the determination of the form and character of structure most suitable to the requirements of aerial vehicles; and the invention while specially applicable thereto has additional and important applications to other structures where the properties of great strength and rigidity combined with lightness are required and where facility in transporting and assembling the elements of the structure is desirable.

The investigations above referred to have been conducted with structures used as kites, the observations being directed to the qualities of strength and stability in all three dimensions and to steadiness in flight as well as to comparative lifting power.

The recent developments in kite structure have been largely due to the investigations of Laurence Hargrave, the results of which are represented in the well-known cellular box-kite. Although multicellular kites have been constructed upon the Hargrave principle, they have not been found to possess any substantial advantage over one composed of two cells only. Hence the familiar form of Hargrave kite is one composed of two rectangular cells. These two cells are disposed with their corresponding surfaces in the same planes and are separated by a considerable space bridged over by a connecting framework of solid material, which is an essential feature of the structure and adds weight to the kite without contributing to the lift. The rectangular cell is structurally weak and easily distorted, requiring internal bracing, which also adds to the dead load besides opposing additional head resistance to the wind, increasing the drift of the kite. Moreover, there is a limitation to the lifting power of kites of this description, since the mere increase of the dimensions of the kite in its several parts does not increase the lifting power proportionately to the supporting-surfaces, but just the reverse. This is due to the fact that the weight increases as the cube of the dimensions, whereas the surface exposed to the action of the air increases only as the square. Hence in two kites differing only in dimensions the ratio of weight to surface will be greater for the larger kite than for the smaller.

I have found that the desired qualities mentioned above reside in a high degree in a cell constructed in the form of a skeleton of a tetrahedron, and cells of this form constitute the units or elements from which a great variety of structures contemplated by this invention are or may be built up. The tetrahedral skeleton or frame may be composed of six bars or rods so connected at their ends as to form the outlines of four triangles. If, as is preferred, the form is that of a regular tetrahedron, the bars will be of equal length, and the triangles will be equilateral. For some purposes a tetrahedral frame in which two of the sides are right-angled triangles is advantageous, and for other purposes the bars may be hollow or constitute closed tubes capable of floating in water and may be triangular in cross-section. This tetrahedral cell or frame is found to possess, with minimum weight of materials, the qualities of rigidity and strength to a remarkable degree and for this reason is adaptable to a great variety of structural uses. Moreover, the finished structures compounded of these elements partake of the qualities of the latter, and the facility with which they may be assembled, connected and dismembered, and the ease of transportation from place to place further contribute to their utility. Considering particularly the subject of aerial vehicles, such as kites, the tetrahedral cell possesses rigidity or strength in three directions—that is to say, vertically, laterally, and longitudinally—so that internal bracing is entirely superfluous and is dispensed with. When one of the bars is taken as a keel and the two opposite triangular surfaces rising therefrom are covered with silk or other suitable material, the other two triangles, being left uncovered, we have a structure which I call a "winged tetrahedral cell." Each of the oblique surfaces of this winged cell is the resultant (and equivalent for the purposes in view) of its horizontal and vertical components, constituting a decided gain in lightness as well as in rigidity. Obviously in building up a compound structure by connecting together a number of these winged cells the ratio of weight to wing-surface remains practically uniform. Experiment shows that kite structures of great size, compounded of these winged tetrahedral cells, fly equally as well in the same breeze as kites composed of a relatively small number of such elements.

Structures of many different forms may be compounded of tetrahedral elements, and it is not possible to state with certainty at this time what form will yield the best results for purposes of aerial locomotion. A prime desideratum for an aerial vehicle is stability in three directions—i. e., fore-and-aft stability, vertical stability, and horizontal stability. Another desirable object is that the vehicle when lowered should descend steadily without oscillation or pitching and should settle gently upon the surface of the ground or water. I have found that these objects are secured in a very high degree by following the tetrahedral principle in the assembling or compounding of the elements as well as in their construction. For example, we may connect four tetrahedral elements in such manner that the resulting structure has itself the outline of a tetrahedron, and we may again connect four of these compound elements to form a tetrahedral structure of still larger size. As far as this operation has been carried the compounded structure has been found to possess all the useful properties of the individual elements. These elements have also been applied to the construction of boats, wind-breaks, &c., and are obviously available for various structures, such as temporary bridges, scaffolding, and the like.

The accompanying drawings will serve to illustrate clearly the principle of the invention and its embodiment in some of the many forms to which it is applicable.

Figure 8:
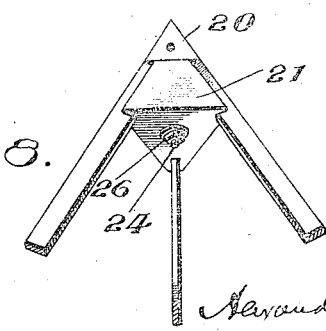

Figure 1 is a plan view of a single tetrahedral element. Fig. 2 is a perspective view showing the element with two of its triangles covered, so as to constitute wings. Fig. 3 illustrates a structure composed of four winged tetrahedral elements so connected together as to form a tetrahedral outline. Fig. 4 illustrates a framework composed of four compound tetrahedral elements such as shown in Fig. 3. Fig. 5 is a perspective view of a tetrahedral nut for connecting the tetrahedral elements in a compound structure. Fig. 6 is a perspective view of a corner-piece or coupling-block for joining the ends of the bars composing the skeleton framework of a tetrahedral element. Fig. 7 is a perspective view of the end of one of said bars. Fig. 8 is a perspective view showing the ends of three bars connected by a corner piece or block and a tetrahedral nut. Fig. 9 illustrates a structure composed of four tetrahedral elements wherein corner-pieces and tetrahedral nuts, such as shown in preceding figures, are employed. In this view the size of the bars, nuts, and corner-pieces relative to the outside dimensions of the complete structure is exaggerated for clearness of illustration. Fig. 10 is a front view illustrating diagrammatically a kite structure composed of four winged cells.

The skeleton tetrahedral element, Fig. 1, is composed of the six equal bars 10, 11, 12, 13, 14, and 15, united at their corners in any suitable way. As shown in Fig. 2, two of the triangles 16 and 17 are covered, constituting triangular oblique wings or surfaces diverging upwardly from the bar 10, which constitutes a keel, and connected at their upper corners by the bar $15^a$. The other two triangles 11 15 14 and 12 15 13 are open or uncovered.

Fig. 3 shows a structure composed of four winged cells $a\ b\ c\ d$, each constructed as shown in Fig. 2, these four cells being connected at their corners in such manner that the complete structure itself has the outline of a tetrahedron, and it will be obvious without further illustration that in building up still larger structures the compound element (represented by Fig. 3) can be treated as a simple element.

Fig. 4 illustrates a framework composed of four compound elements, such as illustrated in Fig. 3—i. e., of sixteen tetrahedral cells, like Fig. 1.

Attention is called to the fact that in combining four tetrahedral structures into the form of a tetrahedron on a larger scale on the plan shown there is left a central vacant space 19 of octahedral form. The boundary-lines of this space may be traced as follows: beginning at the point 40 to 41 to 42 to 43 and back to 40, in the transverse direction from 40 to 44 to 42 to 45 and back to 40, and in the horizontal direction 41 to 44 to 43 to 45 and back to 41. As we proceed to build up still larger tetrahedral forms this space becomes larger, contributing to the stability of the structure in flight as does the interspace in the Hargrave kite; but no necessity exists for a framework extending across it, as in the case of the Hargrave kite, the mode of construction affording solidity without such additional framework. The only portions of the framework not utilized for the support of aeroplanes are the cross-bars at the tops of the cells. This will be obvious from Fig. 3. It will also be observed that the ratio of weight to wing-surface is the same in the four-celled structure shown in Fig. 3 as in the single cell of Fig. 2. This of course could not be if there were dead-weight in the structure not contained in the individual cells themselves, like the framework between the cells of the Hargrave kite. It is certainly a unique feature of tetrahedral construction that the largest flying structures compounded out of winged cells weigh no more relatively to their wing-surfaces than the elementary cells of which they are composed.

Considering the structure of Fig. 3, it will be noted that it presents the feature of two winged cells $a\ b$ separated in a longitudinal direction, this feature imparting the longitudinal stability characteristic of the Hargrave box-kite. It also has two winged cells, as $a\ c$, separated from each other in a vertical direction, and two winged cells $c\ d$ separated in a lateral direction, which peculiarities of construction impart to the structure stability in the vertical and lateral directions, so that the structures possess as a whole what may be termed "three-dimensional stability," as well as "three-dimensional rigidity." Further, it will be noted that owing to the relations which the wing-surfaces sustain to the uncovered or open spaces there are no superposed wing-surfaces and no overlapping of surfaces in the vertical direction. In other words, a line drawn vertically through the structure at any point will pass through one and only one of the wing-surfaces. The same statements hold true of large structures compounded as shown above, regardless of the extent to which the compounding is carried.

It will be observed that a compound structure built up of tetrahedral elements united at their corners must comprise at least four elements and that a tetrahedral element does not become an integral part of a compound structure unless at least three of its corners are attached to the corners of other elements.

The wing-surfaces shown in Figs. 2 and 3 form with each other an angle of about seventy degrees—$i.\ e.$, each surface makes an angle with the horizon of about fifty-five degrees. The angle of most effective lifting power as found empirically is from thirty-five to forty-five degrees. This would suggest that an arrangement wherein the wings make an obtuse angle with each other would be more effective. In such case, however, when the kite tilts in the wind the depressed wing has diminished lifting power and the elevated wing increased power, tending to produce a capsize. With the angle furnished by the tetrahedral form the result is the reverse of this, so that the kite has a self-righting capacity, which capacity increases as the angle between the wings diminishes. To obtain the most effective application of this self-righting capacity, all the wings or surfaces on each side of the central vertical plane of the kite or vehicle should diverge upwardly from said central plane, the surfaces which diverge downwardly from said plane being left uncovered. To illustrate this, reference is made to Fig. 10, which shows a front view of a kite in flying position, the dotted line $m\ n$ representing the central vertical plane of the structure. The surfaces $o\ p\ q\ r$, (indicated by heavy lines,) which surfaces diverge upwardly from plane $m\ n$, are the covered or wing surfaces, while the surfaces $s\ t$, (indicated by light lines and diverging downwardly from said plane,) are uncovered. It will be understood that if the kite should tilt downwardly to the right all the covered surfaces ($o$ and $p$ in the illustration) will approach closer to the angle of most effective lifting power, while the opposite surfaces $q\ r$ recede farther from that angle, thus developing a tendency to restore the equilibrium. If, however, the surfaces $s$ and $t$ were covered, the supposed change of position would diminish the lifting effect of the former and increase that of the latter, thus developing a tendency in opposition to that of the other surfaces. This principle is manifestly applicable to kites or other aerial vehicles composed of a greater number of cells than that illustrated in Fig. 10 and to cellular structures in which the cells or elements are of forms other than tetrahedral—for example, it is applicable to multi-cellular kites or vehicles composed of triangular cells, as described in my Patent No. 757,012, dated April 12, 1904.

In connecting together the six bars constituting an element and in connecting several elements together use may be made of a tetrahedral connecting-nut 20, (illustrated in Fig. 5,) also of a coupling-piece or corner-piece 21. (Illustrated in Fig. 6.) The connecting-nut 20, preferably solid and of metal, has in the center of each of its four faces a screw-threaded socket or opening 27, extending inwardly perpendicular to the plane of its face. The corner-piece 21 is in the shape of a frustum of a tetrahedron and may be made of wood. It is grooved at 22 along three of its edges for receiving tongues 23, Fig. 7, on the three bars which are secured to and connected by said coupling-piece. As will be apparent, the upper and lower faces of the corner-piece in the position in which it is shown in Fig. 6 are parallel. 28 is an opening passing entirely through the corner-piece perpendicular to said parallel faces. In assembling the bars, corner-piece, and tetrahedral connecting-nut and in securing them together in the manner shown in Fig. 8 one face of said connecting-nut fits against the smaller (the upper face, Fig. 6) of the two parallel faces of the corner-piece and against the end surfaces 30, Fig. 7, of the three bars, said end surfaces being flush with said smaller face of the corner-piece. A bolt 24, Fig. 5, screw-threaded at opposite ends, engages at one end in the screw-threaded socket 27 in one face of the tetrahedral connecting-nut and passes through and projects from the opening 28 in the corner-piece. A washer 25 is then slipped over said projecting end of the bolt and a screw-threaded nut 26 engaged therewith to tightly clamp and secure the parts together.

As will be apparent, each of the four faces of the tetrahedral connecting-nuts is available for the attachment of a tetrahedral element or cell in the manner above indicated; but only one, two, or three of said faces may be utilized, depending upon the number of elements used and the manner in which they are grouped. As shown in Fig. 9, each of the six nuts 31 has two of its faces utilized for the attachment of cells, while the nuts 32 at the four corners of the structure have only one face utilized.

It is not essential for any purpose that the compound structure should have the form of a tetrahedron, and for some purposes such form is inadmissible. The tetrahedral skeletons or cells are units or elements susceptible of combination in many ways; but the tetrahedral form of the compounded structure has been specially mentioned because excellent results have been obtained therewith in kite construction, nor is it essential in all cases that a skeleton framework should be employed. For example, it will be seen by reference to Fig. 2 that the two triangular surfaces 16 17 may be thin sheets of metal, such as aluminium, connected at their upper corners by the cross-piece 15, and that these two wings may be formed of a single sheet of aluminium bent along one of the diagonals.

Having now fully explained the principle of my said invention and the manner in which the same is or may be applied in practice, what I claim is—

1. A structure whose framework is composed essentially of skeleton tetrahedral elements combined with means whereby the adjacent elements are directly connected at two or more of their corners.

2. A framework compounded essentially of elements each of which is the skeleton of a regular tetrahedron.

3. An aerial vehicle having a framework composed essentially of tetrahedral elements directly connected at two or more of their corners, and having wings or surfaces.

4. An aerial vehicle comprising winged tetrahedral cells connected together, each cell being directly connected at three or more of its corners with other cells.

5. An aerial vehicle comprising connected winged cells each of which has the outline of a regular tetrahedron.

6. An aerial vehicle comprising four or more tetrahedral cells directly connected at two or more of their corners and having the lateral triangular faces covered to constitute oblique wings or surfaces and the fore-and-aft faces open.

7. An aerial vehicle comprising tetrahedral cells connected at their corners so that the complete structure has the outline of a tetrahedron.

8. An aerial vehicle whose body has the outline of a regular tetrahedron, comprising connected cells of regular tetrahedral form.

9. The combination with bars or strips forming a tetrahedral frame, of a nut of tetrahedral form connecting the meeting ends of the bars or strips.

10. The combination with bars or strips forming a tetrahedral element, of a nut of tetrahedral form, and a corner-piece grooved to receive the bars or strips, said nut and corner-piece connecting the meeting ends of the bars or strips.

11. The combination with two or more tetrahedral elements, of tetrahedral nuts uniting adjacent elements at their corners.

12. In an aerial vehicle, the combination with the framework composed of cellular elements connected together, of oblique aeroplanes all diverging upwardly from the central vertical plane of the structure, opposite or diverging planes making an angle with each other of less than ninety degrees.

13. In an aerial vehicle, a winged cell or element comprising a framework having the form of a skeleton of a regular tetrahedron.

14. An aerial vehicle, comprising winged cells or elements connected to form a compound winged structure, wherein the ratio of weight to supporting-surface is not greater than in the individual cells or elements.

15. An aerial vehicle whose body is composed of four or more winged tetrahedral cells directly connected together at two or more of their corners and having an interspace of large size relative to that of the individual cells.

16. An aerial vehicle whose body is composed of winged tetrahedral cells connected together and having an interspace of octahedral form.

In testimony whereof I have signed this specification in the presence of two subscribing witnesses.

ALEXANDER GRAHAM BELL.

Witnesses:
W. M. MITCHELL,
GILBERT H. GROSVENOR.